United States Patent
VanGilder

(10) Patent No.: US 10,001,761 B2
(45) Date of Patent: Jun. 19, 2018

(54) POWER CONSUMPTION MODEL FOR COOLING EQUIPMENT

(71) Applicant: SCHNEIDER ELECTRIC IT CORPORATION, West Kingston, RI (US)

(72) Inventor: James William VanGilder, Pepperell, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 567 days.

(21) Appl. No.: 14/586,815

(22) Filed: Dec. 30, 2014

(65) Prior Publication Data

US 2016/0187397 A1    Jun. 30, 2016

(51) Int. Cl.
  *G05B 15/02* (2006.01)
  *G06Q 50/06* (2012.01)
  (Continued)

(52) U.S. Cl.
  CPC .......... *G05B 15/02* (2013.01); *G06F 1/3203* (2013.01); *G06Q 10/06* (2013.01); *G06Q 50/06* (2013.01);
  (Continued)

(58) Field of Classification Search
  None
  See application file for complete search history.

(56) References Cited

U.S. PATENT DOCUMENTS

| | | |
|---|---|---|
| 4,962,734 A | 10/1990 | Jorgensen |
| 5,216,623 A | 6/1993 | Barrett et al. |

(Continued)

FOREIGN PATENT DOCUMENTS

| | | |
|---|---|---|
| WO | 03081406 A1 | 10/2003 |
| WO | 06119248 A2 | 11/2006 |

(Continued)

OTHER PUBLICATIONS

"Case Study, Application of TileFlow to Improve Cooling in a Data Center," Innovative Research, Inc., 2004.

(Continued)

*Primary Examiner* — Mohammad Ali
*Assistant Examiner* — Bernard G Lindsay
(74) *Attorney, Agent, or Firm* — Lando & Anastasi, LLP

(57) ABSTRACT

According to various aspects and embodiments, a system and method for managing power consumption of cooling equipment in a data center is provided. The method includes receiving at least one parameter of at least one cooling device, receiving at least one measurement of at least one of an ambient temperature, an ambient humidity, and an airflow rate, and implementing a power consumption efficiency model that includes at least one loss parameter and is based on the at least one parameter of the at least one cooling device. According to certain aspects, implementing the power consumption efficiency model includes determining at least one correction factor for at least one loss parameter based on at least one of the measured ambient temperature, ambient humidity, and airflow rate, applying the at least one correction factor to the at least one loss parameter, and determining a power consumption rate for the at least one cooling device based on the at least one corrected loss parameter.

20 Claims, 7 Drawing Sheets

(51) Int. Cl.
*G06Q 10/06* (2012.01)
*G06F 1/20* (2006.01)
*G06F 1/32* (2006.01)

(52) U.S. Cl.
CPC ............ *G06F 1/206* (2013.01); *G06F 1/3206* (2013.01); *Y02D 10/16* (2018.01)

(56) References Cited

U.S. PATENT DOCUMENTS

| | | |
|---|---|---|
| 5,462,225 A | 10/1995 | Massara et al. |
| 5,581,478 A | 12/1996 | Cruse et al. |
| 5,682,949 A | 11/1997 | Ratcliffe et al. |
| 5,850,539 A | 12/1998 | Cook et al. |
| 5,995,729 A | 11/1999 | Hirosawa et al. |
| 6,055,480 A | 4/2000 | Nevo et al. |
| 6,216,956 B1 | 4/2001 | Ehlers et al. |
| 6,574,104 B2 | 6/2003 | Patel et al. |
| 6,672,955 B2 | 1/2004 | Charron |
| 6,694,759 B1 | 2/2004 | Bash et al. |
| 6,718,277 B2 | 4/2004 | Sharma |
| 6,745,579 B2 | 6/2004 | Spinazzola et al. |
| 6,804,616 B2 | 10/2004 | Bodas |
| 6,859,882 B2 | 2/2005 | Fung |
| 6,862,179 B2 | 3/2005 | Beitelmal et al. |
| 6,881,142 B1 | 4/2005 | Nair |
| 6,886,353 B2 | 5/2005 | Patel et al. |
| 6,964,539 B2 | 11/2005 | Bradley et al. |
| 7,020,586 B2 | 3/2006 | Snevely |
| 7,031,870 B2 | 4/2006 | Sharma et al. |
| 7,032,119 B2 | 4/2006 | Fung |
| 7,051,946 B2 | 5/2006 | Bash et al. |
| 7,146,353 B2 | 12/2006 | Garg et al. |
| 7,155,318 B2 | 12/2006 | Sharma et al. |
| 7,197,433 B2 | 3/2007 | Patel et al. |
| 7,251,547 B2 | 7/2007 | Bash et al. |
| 7,313,503 B2 | 12/2007 | Nakagawa et al. |
| 7,315,448 B1 | 1/2008 | Bash et al. |
| 7,366,632 B2 | 4/2008 | Hamann et al. |
| 7,426,453 B2 | 9/2008 | Patel et al. |
| 7,472,043 B1 | 12/2008 | Low et al. |
| 7,558,649 B1 | 7/2009 | Sharma et al. |
| 7,568,360 B1 | 8/2009 | Bash et al. |
| 7,596,476 B2 | 9/2009 | Rasmussen et al. |
| 7,620,480 B2 | 11/2009 | Patel et al. |
| 7,676,280 B1 | 3/2010 | Bash et al. |
| 7,726,144 B2 | 6/2010 | Larson et al. |
| 7,881,910 B2 | 2/2011 | Rasmussen et al. |
| 7,885,795 B2 | 2/2011 | Rasmussen et al. |
| 7,908,126 B2 | 3/2011 | Bahel et al. |
| 7,975,156 B2 | 7/2011 | Artman et al. |
| 7,979,250 B2 | 7/2011 | Archibald et al. |
| 7,991,592 B2 | 8/2011 | Vangilder et al. |
| 8,155,922 B2 | 4/2012 | Loucks |
| 8,209,056 B2 | 6/2012 | Rasmussen et al. |
| 8,219,362 B2 | 7/2012 | Shrivastava et al. |
| 8,229,713 B2 | 7/2012 | Hamann et al. |
| 8,244,502 B2 | 8/2012 | Hamann et al. |
| 8,249,825 B2 | 8/2012 | VanGilder et al. |
| 8,315,841 B2 | 11/2012 | Rasmussen et al. |
| 8,425,287 B2 | 4/2013 | Wexler |
| 8,473,265 B2 | 6/2013 | Hlasny et al. |
| 8,509,959 B2 | 8/2013 | Zhang et al. |
| 8,825,451 B2 | 9/2014 | VanGilder et al. |
| 2002/0004912 A1 | 1/2002 | Fung |
| 2002/0059804 A1 | 5/2002 | Spinazzola et al. |
| 2002/0062454 A1 | 5/2002 | Fung |
| 2002/0072868 A1 | 6/2002 | Bartone et al. |
| 2003/0084357 A1 | 5/2003 | Bresniker et al. |
| 2003/0084358 A1 | 5/2003 | Bresniker et al. |
| 2003/0084359 A1 | 5/2003 | Bresniker et al. |
| 2003/0115000 A1 | 6/2003 | Bodas |
| 2003/0115024 A1 | 6/2003 | Snevely |
| 2003/0158718 A1 | 8/2003 | Nakagawa et al. |
| 2003/0188208 A1 | 10/2003 | Fung |
| 2003/0193777 A1 | 10/2003 | Friedrich et al. |
| 2003/0196126 A1 | 10/2003 | Fung |
| 2003/0200473 A1 | 10/2003 | Fung |
| 2003/0236822 A1 | 12/2003 | Graupner et al. |
| 2004/0020224 A1 | 2/2004 | Bash et al. |
| 2004/0065104 A1 | 4/2004 | Bash et al. |
| 2004/0075343 A1 | 4/2004 | Wareham et al. |
| 2004/0075984 A1 | 4/2004 | Bash et al. |
| 2004/0089009 A1 | 5/2004 | Bash et al. |
| 2004/0089011 A1 | 5/2004 | Patel et al. |
| 2004/0163001 A1 | 8/2004 | Bodas |
| 2004/0230848 A1 | 11/2004 | Mayo et al. |
| 2004/0238653 A1* | 12/2004 | Alles .................... F24F 3/0442 236/49.3 |
| 2004/0240514 A1 | 12/2004 | Bash et al. |
| 2004/0262409 A1 | 12/2004 | Crippen et al. |
| 2005/0023363 A1 | 2/2005 | Sharma et al. |
| 2005/0055590 A1 | 3/2005 | Farkas et al. |
| 2005/0108582 A1 | 5/2005 | Fung |
| 2005/0177755 A1 | 8/2005 | Fung |
| 2005/0228618 A1 | 10/2005 | Patel et al. |
| 2005/0267639 A1 | 12/2005 | Sharma et al. |
| 2006/0080001 A1 | 4/2006 | Bash et al. |
| 2006/0121421 A1 | 6/2006 | Spitaels et al. |
| 2006/0168975 A1 | 8/2006 | Malone et al. |
| 2006/0214014 A1 | 9/2006 | Bash et al. |
| 2007/0038414 A1 | 2/2007 | Rasmussen et al. |
| 2007/0078635 A1 | 4/2007 | Rasmussen et al. |
| 2007/0150215 A1 | 6/2007 | Spitaels et al. |
| 2007/0174024 A1 | 7/2007 | Rasmussen et al. |
| 2007/0213000 A1 | 9/2007 | Day |
| 2007/0271475 A1 | 11/2007 | Hatasaki et al. |
| 2008/0004837 A1 | 1/2008 | Zwinger et al. |
| 2008/0041076 A1 | 2/2008 | Tutunoglu et al. |
| 2008/0055850 A1 | 3/2008 | Carlson et al. |
| 2008/0104985 A1 | 5/2008 | Carlsen |
| 2008/0105412 A1 | 5/2008 | Carlsen et al. |
| 2008/0174954 A1 | 7/2008 | VanGilder et al. |
| 2009/0112522 A1 | 4/2009 | Rasmussen |
| 2009/0138313 A1 | 5/2009 | Morgan et al. |
| 2009/0138888 A1 | 5/2009 | Shah et al. |
| 2009/0150123 A1 | 6/2009 | Archibald et al. |
| 2009/0205416 A1 | 8/2009 | Campbell et al. |
| 2009/0223234 A1 | 9/2009 | Campbell et al. |
| 2009/0309570 A1 | 12/2009 | Lehmann et al. |
| 2009/0326879 A1 | 12/2009 | Hamann et al. |
| 2009/0326884 A1 | 12/2009 | Amemiya et al. |
| 2010/0106464 A1 | 4/2010 | Hlasny et al. |
| 2010/0211669 A1 | 8/2010 | Dalgas et al. |
| 2010/0256959 A1 | 10/2010 | VanGilder et al. |
| 2010/0286956 A1 | 11/2010 | VanGilder et al. |
| 2010/0287018 A1 | 11/2010 | Shrivastava et al. |
| 2011/0040529 A1 | 2/2011 | Hamann et al. |
| 2011/0213508 A1 | 9/2011 | Mandagere et al. |
| 2011/0246147 A1 | 10/2011 | Rasmussen et al. |
| 2011/0301911 A1 | 12/2011 | VanGilder et al. |
| 2012/0041569 A1 | 2/2012 | Zhang et al. |
| 2012/0071992 A1 | 3/2012 | VanGilder et al. |
| 2012/0158387 A1 | 6/2012 | VanGilder et al. |
| 2012/0170205 A1 | 7/2012 | Healey et al. |
| 2012/0245905 A1 | 9/2012 | Dalgas et al. |
| 2013/0006426 A1 | 1/2013 | Healey et al. |
| 2013/0015253 A1* | 1/2013 | Bergsten ............... F24F 5/0046 236/44 R |
| 2013/0030585 A1 | 1/2013 | Rasmussen et al. |
| 2014/0233173 A1* | 8/2014 | Matsushita ........ H05K 7/20836 361/679.46 |
| 2015/0051749 A1 | 2/2015 | Hancock et al. |

FOREIGN PATENT DOCUMENTS

| | | |
|---|---|---|
| WO | 07095144 A2 | 8/2007 |
| WO | 08144375 A2 | 11/2008 |
| WO | 09014893 A1 | 1/2009 |
| WO | 11019615 A1 | 2/2011 |
| WO | 12037427 A1 | 3/2012 |

(56) References Cited

FOREIGN PATENT DOCUMENTS

| WO | 12082985 A2 | 6/2012 |
|---|---|---|
| WO | 12135038 A1 | 10/2012 |
| WO | 13095494 A1 | 6/2013 |

OTHER PUBLICATIONS

"Management Strategy for Network Critical Physical Infrastructure", White Paper #100, pp. 110, American Power Conversion, Dec. 15, 2003, published on World Wide Web.
"Optimizing facility operation in high density data center environments," 2007, Hewlett-Packard Development Company, pp. 1-25.
Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.
APC User's Guide Brochure, "InfraStruXure Manager," Mar. 2004, 181 pgs.
Ashrae, "Thermal Guidelines for Data Processing Environments" 2004, Atlanta: American Society of Heating, Refrigerating, and Air-Conditioning Engineers, Inc., 2004, Atlanta.
Bash, C. E. et al.: "Balance of Power: Dynamic Thermal Management for Internet Data Centers", IEEE Internet Computing, Jan. 1, 2005, pp. 42-49, vol. 9, No. 1, IEEE Service Center, New York, NY.
Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.
Beitelmal et al., "Thermo-Fluids Provisioning of a High Performance High Density Data Center", Apr. 22, 2006, Springer Science and Business Media, Inc, Distributed and Parallel Databases, 21, pp. 227-238 DOI:10.1 007/s10619-005-0413-0.
Bemis et al, Data Center Airflow Modeling: Helps Facilities Planners Make Informed Decisions. Applied Math Modeling Inc. 2009 [retrieved on Apr. 19, 2012]. Retrieved from the Internet: <URL:http:l/www.coolsimsoftware.com/wwwrooULinkCiick. aspx?fileticket=r1SqFUDtRTk%3D&tabid=189>entire document.
Chandrakant D. Patel, et al., "Thermal Considerations in Cooling Large Scale High Compute Density Data Centers" IEEE 2002, pp. 767-776.
Chen, Q. and Srebric, J., "Simplified Diffuser Boundary Conditions for Numerical Room Airflow Models," Final Report for ASHRAE RP-1009, Department of Architecture, Massachusetts Institute of Technology, Cambridge, MA, 2000, 181 pages.
Donald L. Beaty et al., "High Density Cooling of Data Centers and Telecom Facilities—Part 2," 2005, ASHRAE Transactions, vol. 111, pp. 932-944.
Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.
Ehsan Pakabaznia et al., "Minimizing data center cooling and server power costs", Proceedings of the 14th ACM/IEEE International Symposium on Low Power Electronics and Design, ISLPED '09, Jan. 1, 2009 (Jan. 1, 2009), p. 145, XP55015368, New York, New York, USA, DOI: 10.1145/1594233.1594268, ISBN: 978-1-60-558684-7.
Fried, E. and Idelchik, I.E., "Flow Resistance: A Design Guide for Engineers" Taylor and Francis, 1989, pp. 255-278.
Healey, C., et al., "Potential-Flow Modeling for Data Center Applications," Proceedings of the ASME 2011 Pacific Rim Technical Conference & Exposition on Packaging and Integration of Electronic and Photonic Systems, IPACK2011-52136, Jul. 6-8, 2011.
Herrlin, M.K., "Rack Cooling Effectiveness in Data Centers and Telecom Central Offices: The Rack Cooling INdex (RCI)," ASHRAE Transaction, 2005, pp. 725-731, col. 111(2).
Idelchik, I.E. et al., "Handbook of Hydraulic Resistance 3rd Edition" Jaico Publishing House, 2003, pp. 627-697.

James W. VanGilder et al., "Partially decoupled aisle method for estimating rack-cooling performance in near-real time," 2007, Proceedings of the IPACK2007 ASME InterPACK07, pp. 781-789.
Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007 (Jan. 20, 2007), pp. 193-225, XP019499845, ISSN: 1573-7578, DOI:10.1007/S10619-006-7007-3.
Jeonghwan Choi et al., "A CFD-Based Tool for Studying Temperature in Rack-Mounted Servers", IEEE Transactions on Computers, IEEE Service Center, Los Alamitos, Ca, US, vol. 57, No. 8, Aug. 1, 2008 (Aug. 1, 2008), pp. 1129-1142, ISSN: 0018-9340, DOI: 10.1109/TC.2008.52.
Karki et al., "Techniques for controlling airflow distribution in raised-floor data centers," ASME 2003.
Karki, K.C. et al., "Use of Computational Fluid Dynamics for Calculating Flow Rates Through Perforated Tiles in Raised-Floor Data Centers," International Journal of Heating, Ventilation, Air-Conditioning, and Refrigeration Research, vol. 9, No. 2, Apr. 2003, pp. 153-166.
Karki, Kailash C., "Prediction of Distributed Air Leakage in Raised-Floor Data Centers," ASHRAE Transactions, Jan. 1, 2007, vol. 113, Issue 1, pp. 219-227.
N. Rasmussen, "Calculating Total Cooling Requirements for Data Centers", White Paper #25, pp. 1-8, American Power Conversion, May 20, 2004, published on World Wide Web.
N. Rasmussen, "Cooling Strategies for Ultra-High Density Racks and Blade Servers", White Paper #46, pp. 1-22, American Power Conversion, Mar. 29, 2005, published on World Wide Web.
N. Rasmussen, "Strategies for Deploying Blade Servers in Exisiting Data Centers", White Paper #125, pp. 1-14, American Power Conversion, Mar. 29, 2005, published on World Wide Web.
Neil Rasmussen, "Air Distribution Architecture Options for Mission Critical Facilities," White Paper #55, Revision 1, 2003 American Power Conversion, Rev 2003-0, pp. 1-13.
Neil Rasmussen, "Avoidable Mistakes that Compromise Cooling Performance in Data Centers and Network Rooms," White Paper #49, 2003 American Power Conversion, Rev 2003-0, pp. 1-15.
Neil Rasmussen, "Cooling Options for Rack Equipment with Side-to-Side Airflow," White Paper #50, 2004 American Power Conversion, Rev 2004-0, pp. 1-14.
Neil Rasmussen, "Guidlines for Specification of Data Center Power Density," White Paper #120, 2005 American Power Conversion, Rev 2005-0, pp. 1-21.
Pakbaznia, E.; Ghasemazar, M.; Pedram, M.:, "Temperature-aware dynamic resouce provisioning in a power-optimized datacenter," Design, Automation & Test in Europe Conference & Exhibition (DATE), 2010, vol. No. pp. 124-129, Mar. 8-12, 2010.
Pinheiro, Eduardo, "Load Balancing and Unbalancing for Power and Performance in Cluster-Based Systems," Internet Citation, May 1, 2001 URL:http://research.ac.upc.es/pact01/colp/paper04.pdf, retrieved on Nov. 17, 2003.
Rasmussen, Neil. White Paper #113—"Electrical Efficiency Modeling of Data Centers", American Power Conversion (2006).
Refai-Ahmed G. et al., "Analysis of flow distribution in power supply using flow network modeling (FNM)", Thermal and Thermomechanical Phenomena in Electronic Systems, 2000, ITHERM 2000, The Seventh Intersociety Conference on May 23-26, 2000.
Roger R. Schmidt et al., "Best practices for data center thermal and energy management-review of literature," ASHRAE Transactions, vol. 112, pp. 206-218 [2007].
Sharma, R.K., Bash, C.E., and Patel, C.D., "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.
Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.
Shrivastava S.K. et al., "A flow-network model for predicting rack cooling in containment systems", Proceedings of the ASME Interpack Conference—2009: Presented at 2009 ASME Interpack

(56) References Cited

OTHER PUBLICATIONS

Conference, Jul. 19-23, 2009, San Francisco, California, USA, vol. 2, Jul. 19, 2009 (Jul. 19, 2009), pp. 785-791.
Tony Evans, "Humidification Strategies for Data Centers and Network Rooms," WHite Paper 58, 2004 American Power Conversion, Rev 2004-0, pp. 1-13.
Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lak Buena Vista, Florida, USA, vol. 13: New Del, vol. 13, Jan. 1, 2009 (Jan. 1, 2009), pp. 41-50, DOI: 10.1115/IMECE2009-10806, ISBN: 978-0-7918-4386-4.
Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010 (Jun. 2, 2010), pp. 1-8, XP031702357.
Vangilder et al., "Airflow Uniformity through Perforated Tiles in a Raised-Floor Data Center", WHite Paper 121, Jul. 17-22, 2005, 10 pages.
Vangilder, "Real-Time Data Center Cooling Analysis," APC by Schneider Electric, Billerica, MA USA, Electronics Cooling, Sep. 2011, pp. 14-16.
Vangilder, J.W. et al., "Potential Flow Model for Predicting Perforated Tile Airflow in Data Centers," ASHRAE Transactions 2011, vol. 117, Part 2.
Vangilder, JAmes W. et al., "Capture index: an airflow-based rack cooling performance metric," 2007, ASHRAE Transactions, vol. 113, pp. 126-136.
Vangilder, James W. et al., "Real-Time prediction of rack-cooling performance," 2006, ASHRAE Transactions, vol. 112, pp. 151-162.
White Paper # 6, "Determining Total Cost of Ownership for Data Center and Network Room Infrastructure"—American Power Conversion (2003).
Zhang et al. IPAC2009-89175—"A Real-Time Data Center Airflow and Energy Assessment Tool", Proceedings of IPACK2009, Jul. 19-23, 2009, San Francisco, CA.

* cited by examiner

POWER CONSUMPTION MODEL FOR COOLING EQUIPMENT

BACKGROUND

Field of the Invention

At least one embodiment in accordance with the present invention relates generally to systems and methods for data center management and design, and more specifically, to systems and methods for managing power consumption of cooling equipment in a data center.

Background Discussion

Centralized data centers for computer, communications, and other electronic equipment contain numerous racks of equipment that require power, cooling, and connections to external communication facilities. Data centers remain one of the largest and fastest growing consumers of electricity in the United States. For example, data centers in total used 91 billion kWh of electrical energy in 2013, and this number is predicted to increase to 140 billion kWh by 2020. Further, in an effort to increase efficiency, the current trend in data center design is to increase power density, thereby delivering more power per rack. The increased density of computing equipment puts strains on the cooling and power systems that service these facilities.

Typically, the power consumed by computer equipment is converted to heat and the cooling requirements of a facility are typically determined based on the power requirements of the facility. In fact, 50% or more of the power consumed by data centers is used by cooling equipment. Typical data centers utilize air plenums under raised floors to distribute cooling air through a data center. One or more computer room air conditioners (CRACs) or computer room air handlers (CRAHs) are typically distributed along the periphery of the data room, and these units draw return air from the room or a ceiling plenum and distribute cooling air beneath the raised floor. Perforated tiles may be placed in front or beneath racks of equipment that are to be cooled to allow the cooling air from beneath the floor to cool equipment within the racks.

Operating a data center in an energy efficient state requires the ability to manage power consumption of both the IT equipment and cooling equipment under various operational states in a practical, yet accurate manner. Current mathematical models for managing power consumption of cooling equipment may be roughly grouped into two categories: empirical models and physics-based models. Empirical models may employ past experimental data or approximate trend-type models to predict future behavior without consideration of certain physical principles, and may be generally based on measured and/or manufacturer-provided data. Polynomial, exponential, power law, logarithmic, and trigonometric functions as well as look-up tables are commonly used as empirical models. The computational simplicity of empirical models enables fast computations, but since these models are based on fitting experimental data for a specific set of operating conditions, these predictions can be very poor for operating conditions that are outside this specific set. Physics-based models may require detailed knowledge of one or more of the components of the data center and/or the layout of the components being monitored, and therefore may come at great computational costs and long simulation times.

SUMMARY

Aspects and embodiments are directed to systems and methods for managing power consumption of cooling equipment in a data center. In accordance with one or more embodiments, a method for managing power consumption of cooling equipment in a data center is provided. The method includes acts of receiving at least one parameter of at least one cooling device located in the data center, receiving at least one measurement of at least one of an ambient temperature, an ambient humidity, and an airflow rate, implementing a power consumption efficiency model that includes at least one loss parameter and is based on the at least one parameter of the at least one cooling device, wherein implementing the power consumption efficiency model includes: determining at least one correction factor for at least one loss parameter based on at least one of the measured ambient temperature, ambient humidity, and airflow rate, applying the at least one correction factor to the at least one loss parameter, determining a power consumption rate for the at least one cooling device based on the at least one corrected loss parameter, and displaying the power consumption rate for the at least one cooling device.

According to some embodiments, the at least one loss parameter is at least one of a no-load loss parameter that includes a no-load loss coefficient, a proportional loss parameter that includes a proportional loss coefficient, and a square-law loss parameter that includes a square-law loss coefficient, wherein the no-load loss coefficient, the proportional loss coefficient, and the square-law loss coefficient are each empirically determined constants based on nominal conditions. According to at least one embodiment, the power consumption model includes a no-load loss parameter and the at least one correction factor includes an airflow rate correction factor, the airflow rate correction factor including a ratio between the measured airflow rate and a nominal airflow rate, and the method further comprises applying the airflow rate correction factor to the no-load loss parameter. According to another embodiment, the power consumption model includes a proportional loss parameter and the at least one correction factor includes at least one of an ambient temperature correction factor and an ambient humidity correction factor, and the method further comprises applying at least one of the ambient temperature correction factor and the ambient humidity correction factor to the proportional loss parameter. According to certain embodiments, the ambient temperature correction factor further includes an empirically determined constant based on a mathematical relationship between the at least one cooling device's power consumption, the measured ambient temperature, and a cooling fluid temperature, and the ambient humidity temperature correction factor further includes an empirically determined constant based on a mathematical relationship between the at least one cooling device's power consumption and the measured ambient humidity. According to a further embodiment, the ambient temperature correction factor further includes the measured ambient temperature and a nominal ambient temperature based on the nominal conditions used to determine the proportional loss coefficient and the ambient humidity correction factor includes the measured relative humidity and a nominal ambient humidity based on the nominal conditions used to determine the proportional loss coefficient.

According to various embodiments, receiving the at least one parameter includes receiving a value representative of a cooling load handled by the at least one cooling device. According to a further embodiment, the cooling load includes loads handled by at least one of CRAH, CRAC, fan, and chiller.

According to at least one embodiment, the at least one cooling device includes a plurality of cooling devices and the model further includes aggregating the power losses of each cooling device of the plurality of cooling devices to obtain a total cooling device loss for the data center.

According to another embodiment, receiving the at least one parameter of the at least one cooling device is receiving at least one first parameter of the at least one cooling device, and receiving the at least one measurement of at least one of the ambient temperature, the ambient humidity, and the airflow rate is receiving at least one first measurement of at least one of the ambient temperature, the ambient humidity, and the airflow rate, and the method further comprises: receiving at least one second parameter of the at least one cooling device, receiving at least one second measurement of at least one of the ambient temperature, the ambient humidity, and the airflow rate, and adjusting the power consumption efficiency model based on the at least one second parameter of the at least one cooling device and the at least one second measurement of at least one of the ambient temperature, the ambient humidity, and the airflow rate to determine an updated power consumption rate for the at least one cooling device. According to a further embodiment, the method further includes receiving a plurality of parameters of the at least one cooling device, the plurality of parameters representing a year of parameters of the at least one cooling device, receiving a plurality of measurements of at least one of the ambient temperature, the ambient humidity, and the airflow rate, the plurality of measurements representing a year of measurements of the at least one of the ambient temperature, the ambient humidity, and the airflow rate, adjusting the power consumption efficiency model based on the plurality of parameters of the at least one cooling device and the plurality of measurements of the at least one of the ambient temperature, the ambient humidity, and the airflow rate to determine a plurality of power consumption rates for the at least one cooling device, and aggregating the plurality of power consumption rates to obtain a year-long power consumption rate for the at least one cooling device.

According to some embodiments, the method is performed with a computer and wherein at least one act is performed in a software program housed in a computer.

According to another embodiment, the method further includes adjusting at least one component of a cooling device based on the power consumption rate for the at least one cooling device.

In accordance with certain embodiments, a system for managing power consumption of cooling equipment in a data center is provided. The system includes at least one input configured to receive at least one parameter of at least one cooling device located in the data center and at least one measurement of at least one of an ambient temperature, an ambient humidity, and an airflow rate, a programmable device in communication with the at least one input, the programmable device comprising: a memory for storing the received at least one parameter and the at least one measurement, at least one processor coupled to the memory and configured to: implement a power consumption efficiency model that includes at least one loss parameter and is based on the at least one parameter of the at least one cooling device, wherein implementing the power consumption efficiency model includes: determining at least one correction factor for at least one loss parameter based on at least one of the measured ambient temperature, ambient humidity, and airflow rate, applying the at least one correction factor to the at least one loss parameter, determining a power consumption rate for the at least one cooling device based on the at least one corrected loss parameter, and at least one output in communication with the programmable device and configured to display the power consumption rate for the at least one cooling device.

According to some embodiments, the power consumption model includes a no-load loss parameter and the at least one correction factor includes an airflow rate correction factor, the airflow rate correction factor including a ratio between the measured airflow rate and a nominal airflow rate, and the processors is further configured to apply the airflow rate correction factor to the no-load loss parameter. According to another embodiment, the power consumption model includes a proportional loss parameter and the at least one correction factor includes at least one of an ambient temperature correction factor and an ambient humidity correction factor, and the processor is further configured to apply at least one of the ambient temperature correction factor and the ambient humidity correction factor to the proportional loss parameter. According to a further embodiment, the ambient temperature correction factor further includes an empirically determined constant based on a mathematical relationship between the at least one cooling device's power consumption, the measured ambient temperature, and a cooling fluid temperature, and the ambient humidity temperature correction factor further includes an empirically determined constant based on a mathematical relationship between the at least one cooling device's power consumption and the measured ambient humidity. According to a further embodiment, the ambient temperature correction factor further includes the measured ambient temperature and a nominal ambient temperature based on the nominal conditions used to determine the proportional loss coefficient and the ambient humidity correction factor includes the measured relative humidity and a nominal ambient humidity based on the nominal conditions used to determine the proportional loss coefficient.

In accordance with some embodiments, a method for managing power consumption in a data center is provided. The data center includes at least one cooling device, and the method includes the acts of receiving at least one parameter of the at least one cooling device, receiving at least one measurement of at least one of an ambient temperature, an ambient humidity, and an airflow rate, implementing a power consumption efficiency model that includes at least one loss parameter and is based on the at least one parameter and the at least one measurement, wherein implementing the power consumption efficiency model includes: determining at least one correction factor for at least one loss parameter, applying the at least one correction factor to the at least one loss parameter, determining a power consumption rate for the at least one cooling device based on the at least one corrected loss parameter, and adjusting at least one component of a cooling device based on the power consumption rate.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
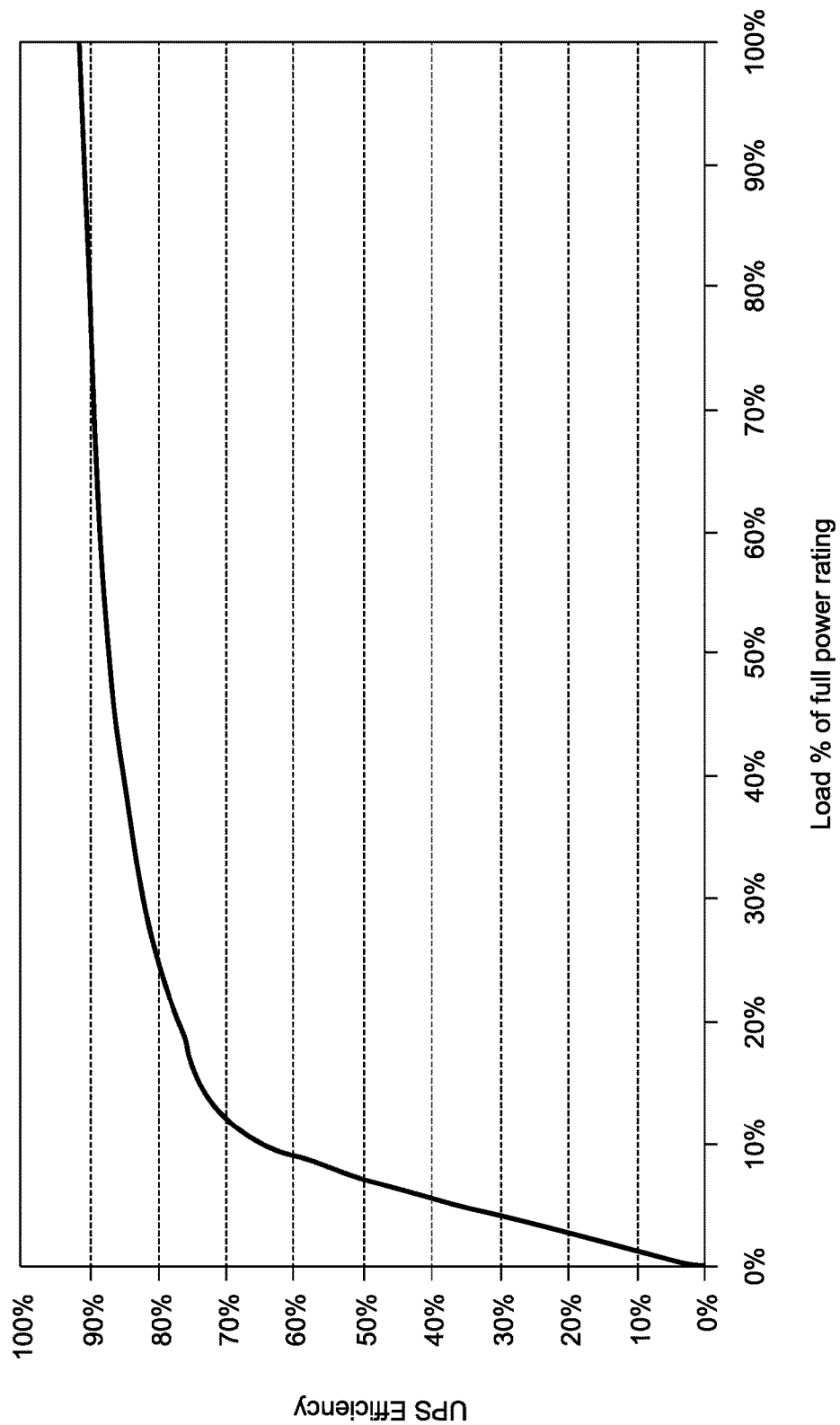
FIG. 1 is a first graph showing UPS efficiency as a function of IT load in accordance with aspects of the invention.

At least some embodiments in accordance with the present invention relate to systems and processes through which a user may analyze and manage power consumption of cooling equipment in a data center. These systems and processes may facilitate this analysis and management activity by allowing the user to use one or more models of cooling equipment power consumption from which power consumption losses may be determined. Further, in at least one embodiment, a system provides modeling of cooling equipment power consumption for an existing (installed) or planned data center. In certain instances, the system may also be used to manage the power consumption of cooling equipment in an installed data center.

Empirical models for power consumption of cooling equipment are simple and fast and therefore convenient to use. However, currently available empirical models lack the ability to model physical effects, such as CRAH fan speed (i.e., airflow rate), and the effects of ambient outdoor conditions, such as temperature and humidity. For example, a chiller plant located in a colder climate such as North Dakota may be expected to consume less energy than the same chiller plant located in a warmer climate such as Louisiana, since the colder climate generally has a lower ambient temperature and a lower humidity. Simple empirical models fail to take these factors into account.

Physical models for power consumption of cooling equipment may include many relevant physical effects, such as the aforementioned ambient temperature, but are very complex and require large amounts of specific equipment data. Further, these models only apply to very specific equipment configurations. As a consequence, physics-based models are not practical for data center design and management.

Aspects of this disclosure relate to systems and methods for managing power consumption of cooling equipment, such as CRAHs, CRACs, chillers, etc. using a semi-empirical model that includes the effects of both airflow rate and ambient conditions, such as temperature and humidity, on cooling equipment power consumption. According to certain aspects, the model is semi-empirical in that one or more of the (empirically determined) constants used in the model are determined based on their ability to provide the best fit to manufacturer-supplied performance data. According to a further aspect, the systems and methods described herein may be used to manage power consumption of cooling equipment in real-time. As used herein, the term "real-time" refers to processes that are completed in a matter of a few seconds or less.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

The electrical efficiency of a data center is expressed as the fraction of the total electrical power supplied to the data center that ultimately is delivered to the Information Technology (IT) devices. The value for efficiency in this case falls between zero and 1, and may be expressed as shown below by Equation 1 for a Data Center Infrastructure Efficiency (DCiE):

$$DCiE = \frac{IT\ Load\ Power}{Total\ Data\ Center\ Input\ Power} \qquad \text{Equation 1}$$

A different related metric for describing data center efficiency is Power Usage Effectiveness (PUE), which is the ratio of total amount of energy used by a data center facility to the energy delivered to the computing environment, and may be expressed as shown below by Equation 2:

$$PUE = \frac{Total\ Facility\ Energy}{IT\ Equipment\ Energy} \qquad \text{Equation 2}$$

Minimizing power consumption requires maximizing the efficiency of the data center. If the data center is 100% efficient, then all of the power supplied to the data center reaches the IT loads. This is an ideal case. In an actual data center, there may be a number of ways that electrical energy is consumed by devices other than the IT loads, including but not limited to: transformers, UPS, power wiring, fans, cooling equipment such as air conditioners, pumps, humidifiers, and lighting. Virtually all of the electrical power feeding the data center, including these devices, ultimately ends up as waste heat.

Power and cooling equipment in the data center are characterized for their losses by the manufacturers, who provide data regarding electrical efficiency for each device. In the case of power equipment, efficiency is typically expressed in percent, i.e., percent of power out to power in. In the case of cooling equipment, efficiency may be expressed as a coefficient of performance, which is the ratio of the heat power removed by the air conditioner (or other cooling device) to the electrical input power. Further, the efficiency of data center equipment, including cooling equipment, may vary over time because the IT load varies over time, the outdoor conditions vary over time, and/or the cooling mode of the data center can change over time.

The variation of data center efficiency may be better understood and described by graphs of efficiency as a function of IT load. FIG. 1 shows how the efficiency of a typical UPS varies with the IT load. A fixed installation of a UPS in a data center has an efficiency curve of the form shown in FIG. 1. Efficiency declines at a lighter load, and is zero when the IT load is zero. This is because there are some losses, such as control logic losses, that are independent of load. This constant loss that is independent of load is known "no load" loss, although it may also be referred to as fixed, shunt, tare, or parallel loss.

Figure 2:
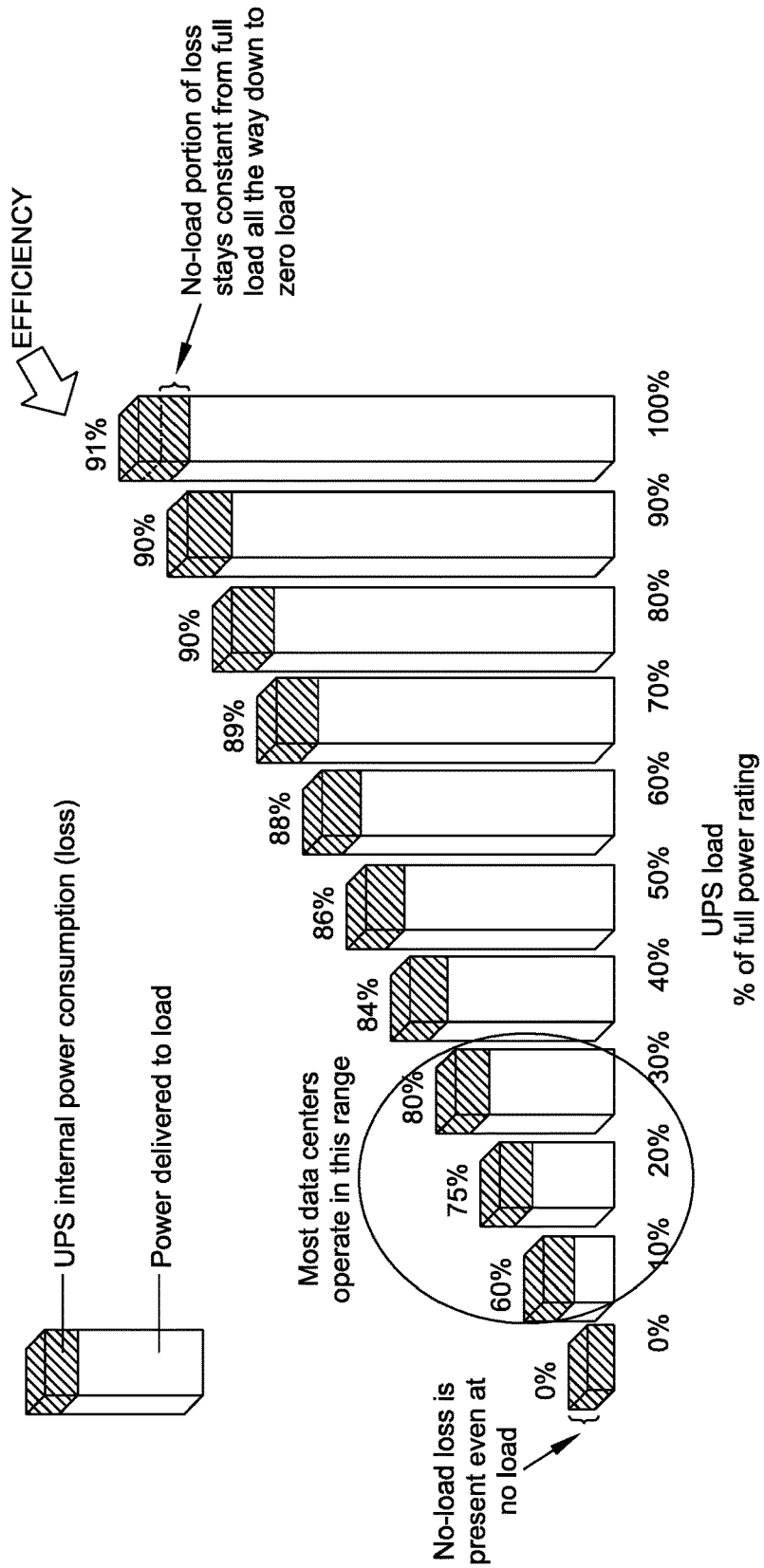
FIG. 2 is a second graph showing the UPS efficiency as a function of IT load of FIG. 1.

FIG. 2 is another view of the same data as FIG. 1. FIG. 2 shows that as the load decreases, the internal power consumption of the UPS (the "loss," shown as the top segmented portion of each bar) becomes a greater and greater fraction of the total power, thus reducing the efficiency percentage value. This is due to the no-load portion of this loss, which stays the same no matter what the load. The UPS described in FIGS. 1 and 2 may be described as having 91% efficiency, but this is the efficiency at full load, or best-case scenario, and fails to reflect the situation at 10% load, where the same UPS exhibits 60% efficiency.

FIG. 2 indicates that the device "loss" (the top segmented portion of each bar) increases as the load increases. This is due to a second type of loss in addition to the first type of no-load loss that is proportional to the load. Further, a third type of loss (not evident in FIG. 2) that is proportional to the square of the load may also be included in the device "loss," which is typically not significant, but may result in decreased efficiency at higher loads. Table 1 below shows typical values of these three types of losses for various types of energy-consuming equipment typically used in a data center. The fixed loss (no-load), the loss proportional to the load (proportional) and the loss proportional to the square of the load (square-law) parameters may be expressed in percent of the nameplate, i.e., rated or nominal capacity. The losses are summed in the last column as the total loss for each component.

TABLE 1

Typical Electrical Losses of Data Center Components Expressed as a Fraction of Full Load Component Nominal Rating

| Energy-Consuming Component | No-load Loss | Proportional Loss | Square-Law Loss | Total Loss |
| --- | --- | --- | --- | --- |
| UPS | 4% | 5% | — | 9% |
| PDU | 1.5% | — | 1.5% | 3% |
| Lighting | 1% | — | — | 1% |
| Wiring | — | — | 1% | 1% |
| Switchgear | — | — | 0.5% | 0.5% |
| Generator | 0.3% | — | — | 0.3% |
| CRAH | 8% | 0% | — | 8% |
| CRAC | 28% | 15% | — | 43% |
| Humidifier | 1% | 1% | — | 2% |
| Chiller | 6% | 26% | — | 32% |

Based on the above, each energy-consuming device may be represented by a power consumption efficiency model that implements the three types of losses discussed above. This three-parameter power consumption efficiency model is expressed below according to Equation 3:

$$\frac{P_{loss}}{P_{nom}} = \alpha^{NL} + \alpha^{P}\left(\frac{P_{load}}{P_{nom}}\right) + \alpha^{S}\left(\frac{P_{load}}{P_{nom}}\right)^2 \qquad \text{Equation 3}$$

where $P_{loss}$ is the total power consumption of the component (e.g., UPS, CRAH, chiller, etc.), $P_{nom}$ is the nominal power rating of the component (e.g., 250 kW UPS, 40 kW CRAH, etc.), $P_{load}$ is the current load on the device (e.g., IT load on a UPS, cooling power load on a CRAH, etc.), $\alpha^{NL}$ is the no-load loss coefficient, $\alpha^{P}$ is the proportional loss coefficient, and $\alpha^{S}$ is the square-law loss coefficient. As discussed above, the no-load loss coefficient $\alpha^{NL}$ represents the power consumption of the component that is a fixed amount whenever the component is turned on, whereas the proportional loss coefficient $\alpha^{P}$ and the square-law loss coefficient $\alpha^{S}$ represent additional power consumption which increases with load. The device efficiency model shown in Equation 3 provides a load in Watts as input and generates a power consumption (or loss) rate as an output.

Figure 3:
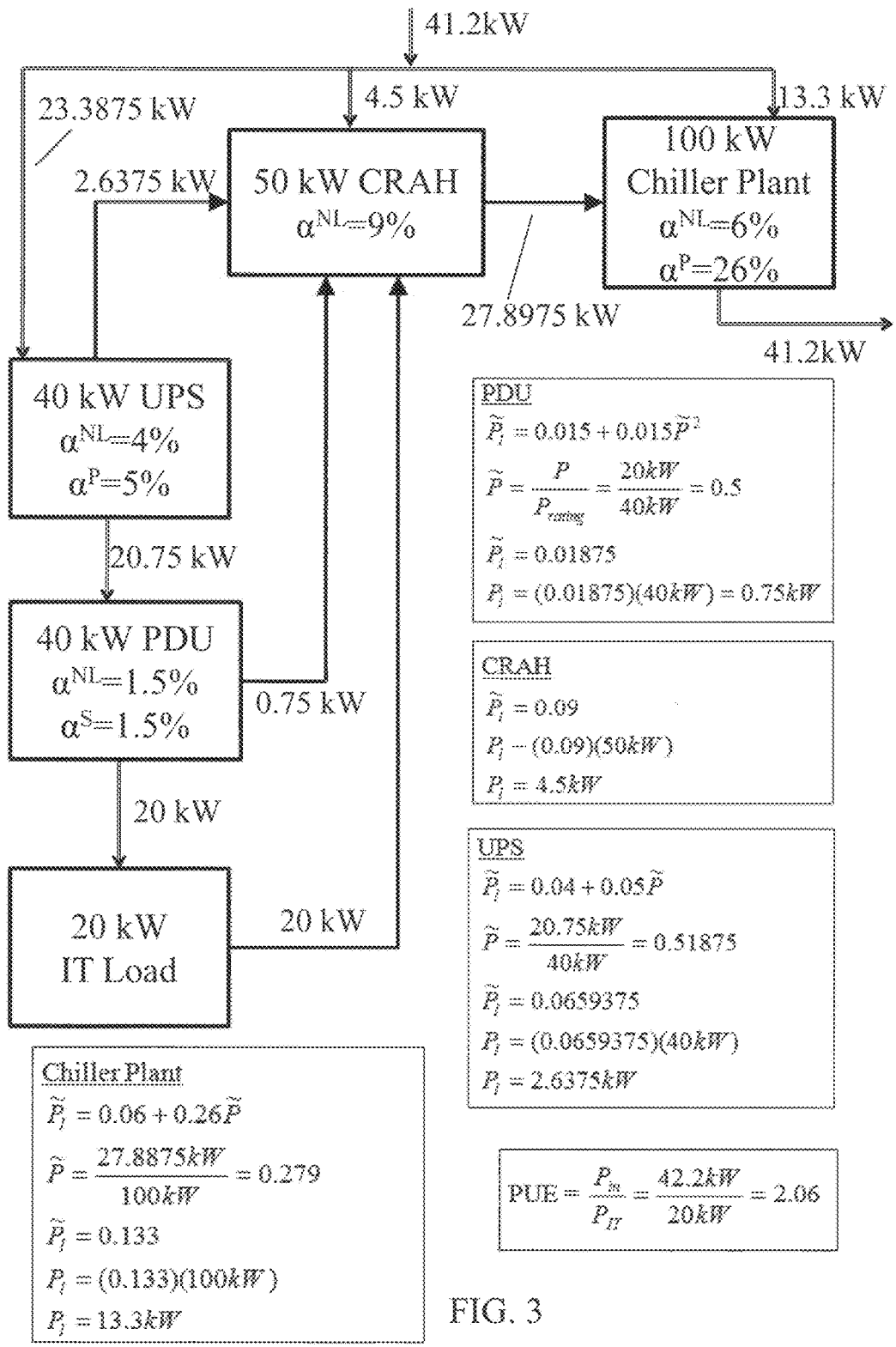
FIG. 3 is a diagram of a sample power path evaluation flow for a data center in accordance with aspects of the invention.

The load on individual device components in a data center typically affects one or more other device components. According to certain aspects, a power path model may be constructed using all components in the data center, such as the power path model shown in FIG. 3. As shown, FIG. 3 includes a model data center having one each of a PDU, CRAH, UPS, and Chiller Plant, and shows their loss coefficients (i.e., $\alpha^{NL}$, $\alpha^{P}$, and $\alpha^{S}$) as given in Table 1, although for purposes of this example, the no-load loss for the CRAH is considered to be 9%. The model includes 20 kW as the IT Load and 41.2 kW as the amount of total electrical power coming in to the data center, which is also the amount of heat rejected to ambient, giving a PUE value of 2.06. As indicated in FIG. 3, the entire 20 kW IT load is lost as heat and is processed by the CRAH unit, which also processes the heat loss attributed to the PDU (0.75 kW) and the UPS (2.6375 kW). Also shown in FIG. 3 are the power consumption calculations, including the loss parameters using Equation 3 for each of the PDU, CRAH, UPS, and chiller plant components. For example, the no-load and square-law loss coefficients for the PDU are each 1.5%, and the dimensionless load $\tilde{P}_l = P_{load}/P_{nom} = 20$ kW/40 kW=0.5. Using these values to determine $P_{loss}/P_{nom}$, and multiplying this value by the nominal power rating for the PDU (40 kW) indicates that 0.75 kW is lost to heat.

One or more factors may affect the electrical power consumption of cooling equipment, such as CRAHs, CRACs, and chillers, including outdoor temperature (i.e., ambient temperature), outdoor humidity (i.e., ambient or relative humidity), and operator settings, such as chilled water set points and fan speeds. For example, the chiller may be affected by dew point, which may impact the proportional loss parameter discussed above in reference to Equation 3. Further, the CRAH may be affected by the chilled water temperature, which may also affect the proportional loss parameter. The CRAH may also be affected, as discussed further below, by the fan speed, which may impact the no-load loss parameter.

CRAH devices generate conditioned air by blowing air over a cooling coil filled with chilled water. The chilled water is typically supplied to the CRAH unit by a chilled water plant (i.e., a chiller plant). Most of the power supplied to a chilled-water based CRAH is consumed in the fans. The three-parameter model above for a CRAH typically includes only the first term, since these devices have historically operated at a fixed fan speed. However, with the increase in use of variable frequency drive (VFD) technology, the fan speed may be adjustable. Since fan power consumption scales with the cube of airflow rate, the no-load component of the three-parameter model of Equation 3 above may be extended to include a correction for fan speed and may be expressed according to Equation 4 below:

$$\frac{P_{loss}}{P_{nom}} = \alpha^{NL}\left(\frac{Q}{Q_{nom}}\right)^3 \qquad \text{Equation 4}$$

where Q is the current operating airflow rate, and $Q_{nom}$ is the nominal (typically the maximum) airflow rate which is associated with the nominal power $P_{nom}$. In accordance with some embodiments, the no-load coefficient $\alpha^{NL}$ in Equation 4 may be an empirically determined value. For instance, according to one example, $\alpha^{NL}$ may be in the range of 3-4% for Uniflair™ products.

In accordance with some embodiments one or more of the no-load loss coefficient $\alpha^{NL}$, the proportional loss coefficient $\alpha^P$, and the square-law loss coefficient $\alpha^S$ may be empirically determined values based on nominal conditions.

As used herein, the term "nominal conditions" refers to the operating conditions used to determine a rated capacity, for example, the outdoor (ambient) temperature, outdoor (ambient or relative) humidity, altitude, return air temperature, cooling fluid temperature such as water temperature, fan speed (airflow rate) etc.

Equation 4 indicates that when $Q=Q_{nom}$, the CRAH power consumption reverts back to the original model represented by Equation 3. However, when the airflow rate drops to half the nominal value, then power consumption reduces to $\frac{1}{8}^{th}$ the power consumption of that under nominal conditions.

CRAC devices generate conditioned air via a direct expansion (DX) refrigeration cycle using compressors. Cooling is accomplished by blowing air over a cooling coil filled with refrigerant. For CRAC units one or more of the proportional and square-law loss parameters may be retained in the original model represented by Equation 3. While the power consumption efficiency model may not be instantaneously correct, the model may be accurate on average over many compressor cycles.

Chillers are typically refrigerant-based systems and may be modeled as individual devices, or as an entire "chiller plant" which may include pumps, cooling towers, etc. In either case, the first two terms of Equation 3 (i.e., the no-load parameter and proportional parameter terms, respectively) are generally required. This is because chillers consumer more power as the ambient temperature increases since the absolute temperature difference between the ambient and the chilled water ultimately supplied to the CRAHs increases. Consequently, the additional power consumption is driven according to Equation 5 below:

$$\Delta T_{air-water} = T^{amb} - T^{EW} \qquad \text{Equation 5}$$

where $T_{amb}$ is the ambient air temperature and $T_{EW}$ is the water temperature entering the CRAHs (i.e., supplied to the building). In accordance with one or more embodiments, the power consumption of the chiller increases by a predetermined value for each degree Celsius (° C.) increase in $\Delta T_{air-water}$. For instance, the power consumption of the chiller may increase by 2.4%-3.3% for each ° C. increase in $\Delta T_{air-water}$, for example, for Uniflair™ chillers. Thus, the power consumption model of Equation 3 for chillers may be expanded according to Equation 6 below:

$$\frac{P_{loss}}{P_{nom}} = \alpha^{NL} + \alpha^P\left(\frac{P_{load}}{P_{nom}}\right)\{1 - C(\Delta T^{nom}_{air-water} - \Delta T^{load}_{air-water})\} \qquad \text{Equation 6}$$

where
$T_{air-water}^{nom} = \Delta T_{air-water}$ under nominal conditions (from which $\alpha^{NL}$ and $\alpha^P$ were determined) and $\Delta T_{air-water}^{load} = \Delta T_{air-water}$ under actual (operational) load conditions. According to certain embodiments, the constant "C" is an empirically determined constant. For example, $C \approx 0.03/°$ C.=0.017/° F., for Uniflair™ air-cooled chillers. Thus, the constant C may be an empirically determined constant based on a mathematical relationship between the device's power consumption, the ambient temperature, and the cooling fluid temperature. Equation 6 indicates that when $\Delta T_{air-water}^{load} = \Delta T_{air-water}^{nom}$ the model reduces to the original three-parameter model of Equation 3. Further, when $\Delta T_{air-water}^{load} > \Delta T_{air-water}^{nom}$ then power consumption increases, and when $\Delta T_{air-water}^{load} < \Delta T_{air-water}^{nom}$ then power consumption decreases. In certain instances, Equation 6 is accurate up to a certain threshold value of $\Delta T_{air-water}^{load}$ where the chiller plant switches to economizer mode, which would require a different form of Equation 6.

In accordance with at least one embodiment, the ambient temperature correction factor, i.e., $\{1-C(\Delta T_{air-water}^{nom} - \Delta T_{air-water}^{load})\}$ of Equation 6 may also be applied to the no-load (first term) loss parameter and/or square-law (third term) loss parameter of Equation 3.

A similar correction for power consumption losses may be made for ambient humidity (also referred to herein as relative humidity). Chiller systems that include cooling towers or other components in which evaporative cooling is used will consume more power as humidity increases. Analogous to the temperature adjustment discussed above with respect to Equation 6, the power consumption efficiency model of Equation 3 may be expanded according to Equation 7 below:

$$\frac{P_{loss}}{P_{nom}} = \alpha^{NL} + \alpha^P \left( \frac{P_{load}}{P_{nom}} \right) \{1 - D(RH^{nom} - RH^{load})\} \quad \text{Equation 7}$$

where $RH^{nom}$ is the relative humidity under nominal conditions (from which $\alpha^{NL}$ and $\alpha^P$ were determined), and $RH^{load}$ is the relative humidity under actual (operational) conditions. The constant "D" may be determined empirically based on measured or published data and may be interpreted as the percentage increase in power consumption per percentage-point change in relative humidity. Thus, the constant D may be an empirically determined constant based on a mathematical relationship between the device's power consumption and the measured ambient humidity. Further, in accordance with some embodiments, the ambient humidity correction factor, i.e., $\{1-D(RH^{nom}-RH^{load})\}$ may be applied to the no-load loss and/or square-law loss parameter terms of Equation 3. Further, the correction may be based on humidity ratios, or wet bulb temperatures, instead of relative humidity.

According to at least one embodiment, the power consumption efficiency model for chillers may include corrections for both ambient temperature, i.e., Equation 6, and humidity, i.e., Equation 7, according to Equation 8 below:

$$\frac{P_{loss}}{P_{nom}} = \alpha^{NL} + \alpha^P \left( \frac{P_{load}}{P_{nom}} \right) \quad \text{Equation 8}$$
$$\{1 - C(\Delta T^{nom}_{air-water} - \Delta T^{load}_{air-water})\}\{1 - D(RH^{nom} - RH^{load})\}$$

In accordance with some embodiments, one or more of these corrections may be applied to the no-load loss and/or square-law loss parameter terms of Equation 3.

In accordance with one or more embodiments, the systems and methods disclosed herein may include or otherwise make use of one or more sensors. For example, one or more sensors may be configured to detect one or more properties or characteristics of the data center and/or the outside (ambient) environment. For instance, one or more sensors may be configured to measure power to one or more loads, and/or environmental conditions, such as the ambient temperature and/or ambient humidity. For instance, power measurements may also be used, such as through power measurement capability that is built directly into the cooling equipment, or through one or more circuits associated with the cooling equipment. One or more sensors may also be configured to detect the fan speed (airflow rate) of a CRAH unit, and the temperature of the cooling fluid entering the cooling unit (e.g., water temperature entering the CRAH). The sensor(s) may also be configured to generate a signal representative of the measured property or characteristic that may then be sent to one or more controllers, such as the processor discussed below. The controller may then use the measurements to control one or more components of the data center, as discussed further below.

According to some embodiments, the methods and systems may include receiving at least one parameter of at least one cooling device. For example, the methods and systems may include receiving a value representative of a cooling load handled by at least one cooling device. For instance, the cooling load may include loads handled by at least one of a CRAH, CRAC, fan, and chiller. The at least one parameter may be input into the system by a user or by a computing device, and in certain instances may be determined by a computer system, as discussed further below.

According to a further embodiment, the corrections discussed above that are applied to the power consumption efficiency model of Equation 3 are not limited to the cooling units, e.g., CRAHs and CRACs, and chiller systems. For example, the corrections may also be used for any other data center infrastructure component that uses power and features fan-driven airflow, such as air-side economizers, UPSs, PDUs, and other electrical infrastructure, etc. According to another example, the corrections may also be used for any other component that rejects heat to the outside ambient environment, such as economizers. In addition, one or more of the components may include corrections for both the fan speed, e.g., Equation 4, and outside ambient conditions, e.g., Equations 6, 7, and/or 8.

Figure 4:
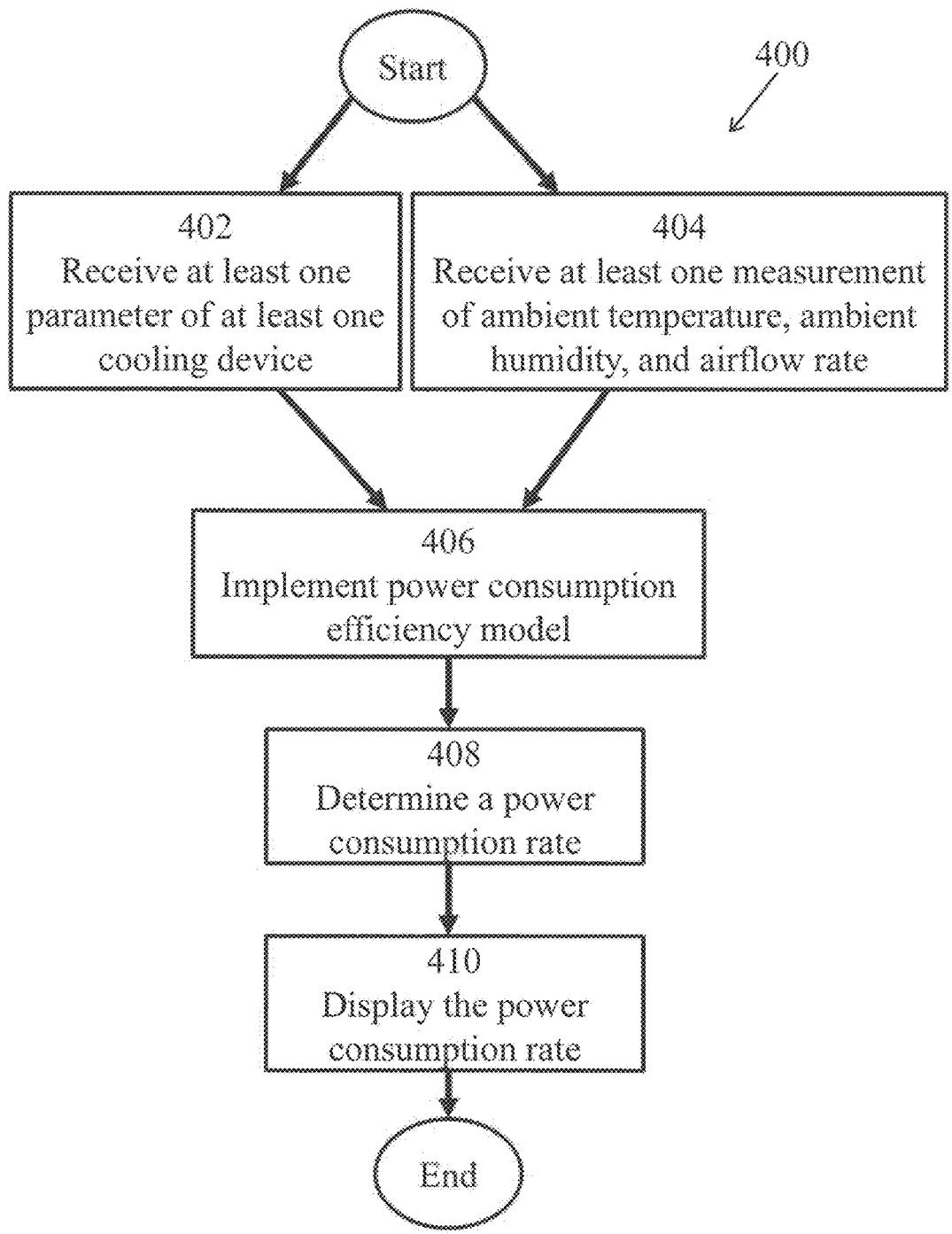
FIG. 4 is a flowchart for a process for modeling power consumption in accordance with aspects of the invention.

A general process 400 for managing power consumption of cooling equipment is shown in FIG. 4. First, at act 402, at least one parameter, such as a value representative of a cooling load handled by the at least one cooling device is received. At act 404 at least one measurement of at least one of an ambient temperature, an ambient humidity, and an airflow rate is received. As discussed further below in reference to FIG. 5, the methods and systems disclosed herein may be implemented by data center design or management software and therefore the received data may be entered either automatically, i.e., through sensors in communication with a controller, or manually, i.e., by a user, into software. Next, at act 406, a power consumption efficiency model is implemented, as discussed and described above. For example, the power consumption efficiency model may include at least one loss parameter and may be based on the at least one parameter of the at least one cooling device. Further, implementing the power consumption efficiency model may include determining at least one correction factor for at least one loss parameter based on at least one of the measured ambient temperature, ambient humidity, and airflow rate. Implementing the model may further include applying the at least one correction factor to the at least one loss parameter. The power consumption efficiency model may be used to determine a power consumption rate for the at least one cooling device at act 408. For example, the power consumption rate may be based on the at least one corrected loss parameter. The power consumption rate may be displayed at act 410, for example, through an output device such as a user display, as discussed further below.

In accordance with at least one embodiment, the power consumption efficiency model discussed above may be used to manage cooling equipment power consumption of cooling equipment in a data center. For example, the model may be applied to a plurality of cooling devices, the results of which may be aggregated to obtain a total cooling device loss for the data center. According to another example, an initial or first set of parameters pertaining to the cooling device (e.g., cooling load) and measurements (e.g., ambient temperature, ambient humidity and/or airflow rate)) may be used by the model to obtain an initial power consumption rate, and then a second set of parameters and measurements may be used by the model to obtain an updated power consumption rate. In accordance with some embodiments, one or more of the models described herein may be extended to determine year-round power consumption by integrating power consumption over the range of annual weather data for a specific location. At least one advantage of these embodiments is that little or no additional input data is needed beyond the original input data required for the models discussed above. According to a further aspect, the model may update in real-time, for example, through receiving updated values pertaining to the at least one parameter associated with the cooling device and the at least one measurement, to produce an updated power consumption rate.

According to some embodiments, the power consumption efficiency model discussed above may be used to provide assessments and/or recommendations, and in certain instances, control one or more components of the cooling equipment. For example, recommendations or assessments may be provided, such as through a user interface, to a user that may be used to improve efficiency and/or minimize power consumption associated with cooling device power consumption. For instance, one or more components of a cooling device may be adjusted or otherwise controlled based on the results determined from the power consumption efficiency model. Further, a fan speed may be adjusted manually by a user or automatically by a controller, as discussed below, based on the results of the power consumption efficiency model. According to another example, the cooling fluid temperature and/or flow rate of a cooling device may be adjusted by a user or controller based on the results from the model. Further, one or more components of the cooling system, e.g., CRAHs/CRACs, pumps, chiller, cooling tower, etc., may be adjusted or otherwise configured so that the combined effect minimizes the system-wide power consumption. Other recommendations or adjustments may include adding, replacing, or removing a cooling device, or a component of a cooling device. According to a further aspect, recommendations or adjustments may also include adjusting one or more equipment racks (and their components) associated with a cooling device. For instance, the IT load handled by a first equipment rack may be altered by consolidating it with the IT load handled by a second equipment rack and then powering off the first equipment rack. One or more of the adjustments discussed above may be implemented to improve power consumption efficiency and decrease operating costs.

Various aspects and functions described herein, including the power consumption efficiency models discussed above, may be included as specialized hardware or software components executing in one or more computer systems. For example, one or more acts of the method described above may be performed with a computer, where at least one act is performed in a software program housed in a computer. Non-limiting examples of computer systems include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 5:
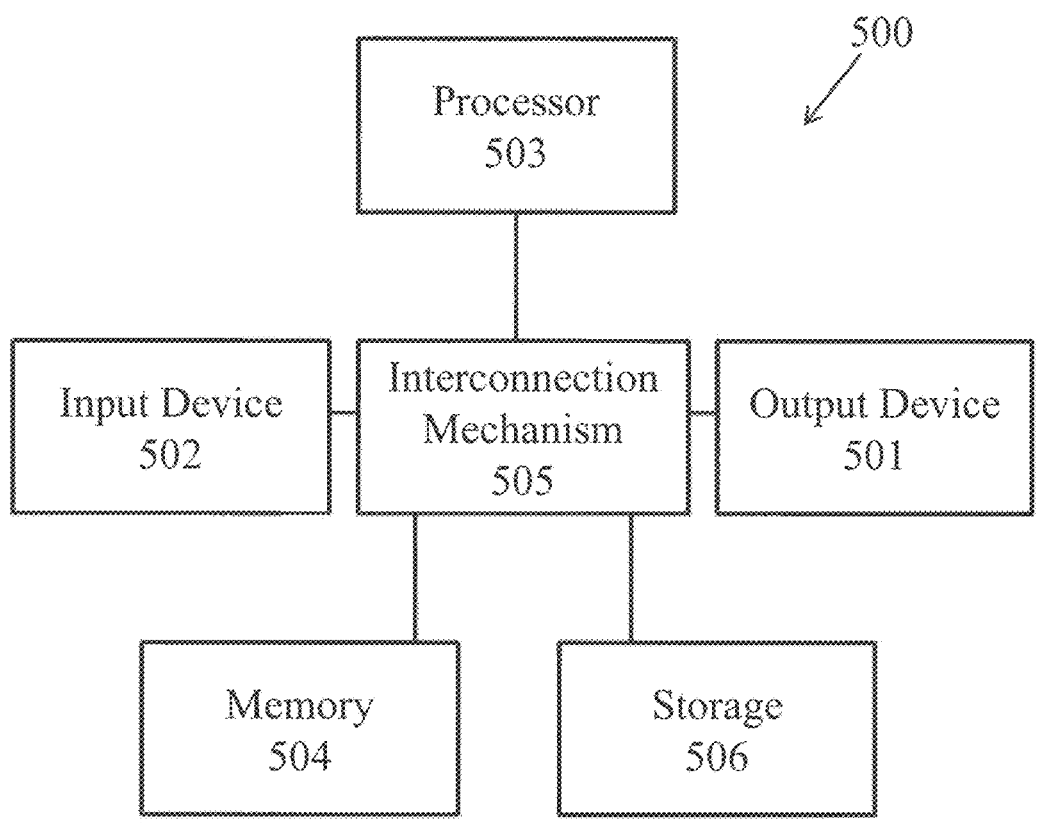
FIG. 5 is a block diagram of one example of a computer system that may be used to perform processes and functions disclosed herein.

According to some embodiments, various aspects of the disclosure may be implemented as specialized software executing in a computer system 500 such as that shown in FIG. 5. Computer system 500 may includes one or more output devices 501, one or more input devices 502, a processor 503 connected to one or more memory devices 504 through an interconnection mechanism 505 and one or more storage devices 506 connected to interconnection mechanism 505. Output devices 501 typically render information for external presentation and examples include a monitor or other type of user display and a printer. Input devices 502 typically accept information from external sources and examples include a keyboard and a mouse. Non-limiting examples of input and output devices include keyboards, mouse devices, trackballs, microphones, touch screens, printing devices, display screens, speakers, network interface cards, etc. Input and output devices allow the computer system 500 to exchange information and to communicate with external entities, such as users and other systems.

Processor 503 typically performs a series of instructions resulting in data manipulation. Processor 503 is typically a commercially available processor, but may be any type of processors, multiprocessor or controller. Some example processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. Memory devices 504, such as a disk drive, memory, or other device for storing data is typically used for storing programs and data during operation of the computer system 500. Devices in computer system 500 may be coupled by at least one interconnection mechanism 505, which may include, for example, one or more communication elements (e.g., busses) that communicate data within system 500.

Figure 6:
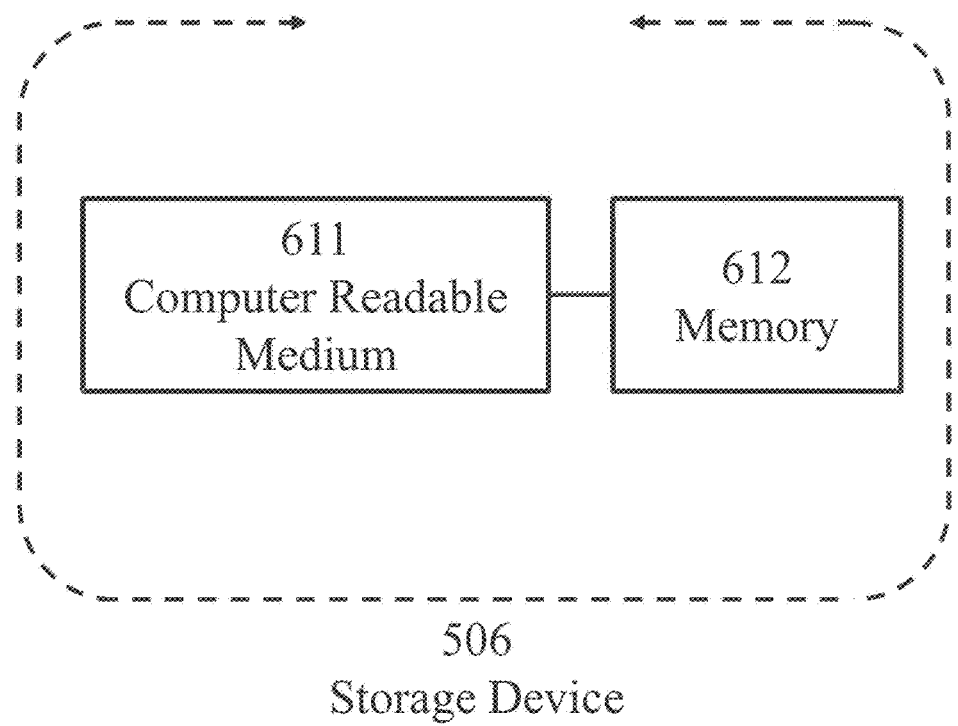
FIG. 6 illustrates a storage device of a computer system in accordance with aspects of the invention.

The storage device 506, shown in greater detail in FIG. 6, typically includes a computer readable and writeable non-volatile recording medium 611 in which signals are stored that define a program to be executed by the processor or information stored on or in the medium 611 to be processed by the program. The medium may, for example, be a disk or flash memory. Typically, in operation, the processor causes data to be read from the nonvolatile recording medium 611 into another memory 612 that allows for faster access to the information by the processor than does the medium 611. This memory 612 is typically a volatile, random access memory such as a dynamic random access memory (DRAM), static memory (SRAM). Memory 612 may be located in storage device 506, as shown, or in memory device 504. The processor 503 generally manipulates the data within the memory 504, 612 and then copies the data to the medium 611 after processing is completed. A variety of mechanisms are known for managing data movement between the medium 611 and the memory 504, 612, and the disclosure is not limited thereto. The disclosure is not limited to a particular memory device 504 or storage device 506.

Computer system 500 may be implemented using specially programmed, special purpose hardware, or may be a general-purpose computer system that is programmable using a high-level computer programming language. For example, computer system 500 may include cellular phones and personal digital assistants. Computer system 500 usually executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and the disclosure is not limited to any particular operating system.

Although computer system 500 is shown by way of example as one type of computer system upon which various aspects of the disclosure may be practiced, it should be appreciated that the disclosure is not limited to being implemented on the computer system as shown in FIG. 5. Various aspects of the disclosure may be practiced on one or more computers having a different architecture or components than that shown in FIG. 5. To illustrate, one embodiment of the present disclosure may receive network device provisioning requests using several general-purpose computer systems running MAC OS System X with Motorola PowerPC processors and several specialized computer systems running proprietary hardware and operating systems.

Figure 7:
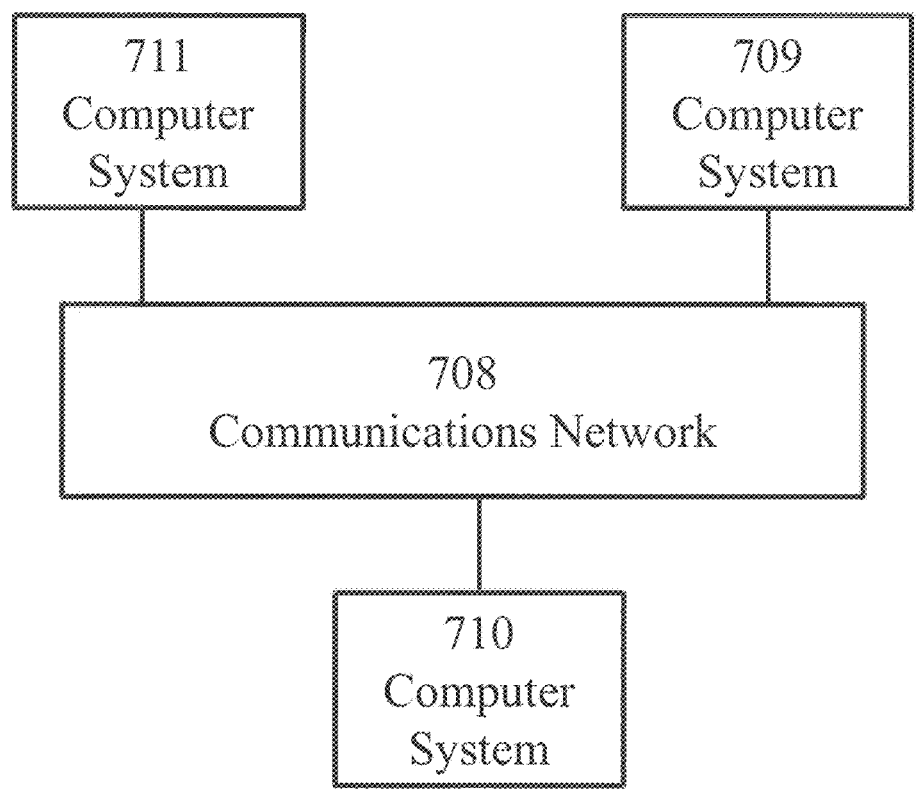
FIG. 7 illustrates a network of computer systems in accordance with aspects of the invention.

As depicted in FIG. 7, one or more portions of the system may be distributed to one or more computers (e.g., systems 709-711) coupled to communications network 708. The physical media used in communications network 708 may include any known in the art, such as, for example, physical cabling and/or wireless technology (e.g. RF, Infrared, etc.). Moreover, each physical medium may comply with various standards such as, for example, CAT 5 cabling standard or IEEE 802.11, Bluetooth and Zigbee wireless standards. The computer systems 709-711 may also be general-purpose computer systems. For example, various aspects of the disclosure may be distributed among one or more computer systems configured to provide a service (e.g., servers) to one or more client computers, or to perform an overall task as part of a distributed system. More particularly, various aspects of the disclosure may be performed on a client-server system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). To illustrate, one embodiment may display network device provisioning request status information though a browser interpreting HTML forms and may retrieve data center resource provider information using a data translation service running on a separate server.

Various embodiments of the present disclosure may be programmed using an object-oriented programming language, such as Net, SmallTalk, Java, C++, Ada, C# (C-Sharp), Python, or JavaScript. Other object-oriented programming languages may also be used. Alternatively, functional, scripting, and/or logical programming languages may be used.

Additionally, various aspects of the disclosure may be implemented in a non-programmed environment, for example, documents created in HTML, XML or other format that, when viewed in a window of a browser program, can render aspects of a graphical-user interface (GUI) or perform other functions. Further, various examples may be implemented as programmed or non-programmed elements, or any combination thereof. For example, a web page may be implemented using HTML while a data object called from within the web page may be written in C++ or Python. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the disclosure is not limited to a particular computer system platform, processor, operating system, network, or communication protocol. Also, it should be apparent that the present disclosure is not limited to a specific architecture or programming language.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A method for managing power consumption of cooling equipment in a data center, comprising:
receiving at least one parameter of at least one cooling device located in the data center;
receiving, by a controller comprising a processor, measurements of an ambient temperature, an ambient humidity, and an airflow rate from one or more sensors;
implementing a power consumption efficiency model that includes at least one loss parameter and is based on the at least one parameter of the at least one cooling device, wherein the loss parameter is at least one of a no-load loss parameter, a proportional loss parameter, and a square-law loss parameter associated with the power consumption efficiency of the cooling equipment, and implementing the power consumption efficiency model includes:

determining at least one correction factor for at least one loss parameter, the at least one correction factor including an ambient temperature correction factor based on the measured ambient temperature and a nominal ambient temperature, an ambient humidity correction factor based on a difference between the measured ambient humidity and a nominal ambient humidity, and an airflow rate correction factor based on the measured airflow rate and a nominal airflow rate, the measured airflow rate associated with a fan of the at least one cooling device;

applying the at least one correction factor to the at least one loss parameter by multiplying the at least one loss parameter by the at least one correction factor;

determining a power consumption rate for the at least one cooling device based on the at least one corrected loss parameter;

displaying the power consumption rate for the at least one cooling device; and adjusting at least one component of the at least one cooling device, by the controller, based on the power consumption rate for the at least one cooling device, wherein the component comprises at least one of: a computer room air conditioner (CRAC), a computer room air handler (CRAH), a pump, a chiller, or a cooling tower, and wherein the adjustment comprises adjusting at least one of a fan speed, a cooling fluid temperature, and a cooling fluid flow rate.

2. The method of claim 1, wherein the no-load loss parameter includes a no-load loss coefficient, the proportional loss parameter includes a proportional loss coefficient, and the square-law loss parameter includes a square-law loss coefficient, and the no-load loss coefficient, the proportional loss coefficient, and the square-law loss coefficient are each empirically determined constants based on nominal conditions.

3. The method of claim 2, wherein the power consumption model includes a no-load loss parameter and the airflow rate correction factor includes a ratio between the measured airflow rate and the nominal airflow rate, and the method further comprises applying the airflow rate correction factor to the no-load loss parameter.

4. The method of claim 2, wherein the power consumption model includes a proportional loss parameter and the method further comprises applying at least one of the ambient temperature correction factor and the ambient humidity correction factor to the proportional loss parameter.

5. The method of claim 4, wherein
the ambient temperature correction factor further includes an empirically determined constant based on a mathematical relationship between the at least one cooling device's power consumption, the measured ambient temperature, and a cooling fluid temperature, and
the ambient humidity correction factor further includes an empirically determined constant based on a mathematical relationship between the at least one cooling device's power consumption and the measured ambient humidity.

6. The method of claim 5, wherein the nominal ambient temperature is based on the nominal conditions used to determine the proportional loss coefficient and the nominal ambient humidity is based on the nominal conditions used to determine the proportional loss coefficient.

7. The method of claim 1, wherein receiving the at least one parameter includes receiving a value representative of a cooling load handled by the at least one cooling device.

8. The method of claim 7, wherein the cooling load includes loads handled by at least one of CRAH, CRAC, fan, and chiller.

9. The method of claim 1, wherein the at least one cooling device includes a plurality of cooling devices and implementing the power consumption efficiency model further includes aggregating the power losses of each cooling device of the plurality of cooling devices to obtain a total cooling device loss for the data center.

10. The method of claim 1, wherein
receiving the at least one parameter of the at least one cooling device is receiving at least one first parameter of the at least one cooling device, and
receiving the measurements of the ambient temperature, the ambient humidity, and the airflow rate is receiving first measurements of the ambient temperature, the ambient humidity, and the airflow rate, and the method further comprises:
receiving at least one second parameter of the at least one cooling device;
receiving second measurements of the ambient temperature, the ambient humidity, and the airflow rate; and
adjusting the power consumption efficiency model based on the at least one second parameter of the at least one cooling device and the second measurements of the ambient temperature, the ambient humidity, and the airflow rate to determine an updated power consumption rate for the at least one cooling device.

11. The method of claim 1, further comprising:
receiving a plurality of parameters of the at least one cooling device, the plurality of parameters representing a year of parameters of the at least one cooling device;
receiving a plurality of measurements of the ambient temperature, the ambient humidity, and the airflow rate, the plurality of measurements representing a year of measurements of the ambient temperature, the ambient humidity, and the airflow rate;
adjusting the power consumption efficiency model based on the plurality of parameters of the at least one cooling device and the plurality of measurements of the ambient temperature, the ambient humidity, and the airflow rate to determine a plurality of power consumption rates for the at least one cooling device; and
aggregating the plurality of power consumption rates to obtain a year-long power consumption rate for the at least one cooling device.

12. The method of claim 1, wherein the controller is a computer and the method is performed with the computer and at least one act is performed in a software program housed in the computer.

13. A system for managing power consumption of cooling equipment in a data center, comprising:
one or more sensors configured to measure ambient temperature, ambient humidity, and an airflow rate;
a controller comprising:
at least one input in communication with the one or more sensors and configured to receive at least one parameter of at least one cooling device located in the data center and measurements of the ambient temperature, the ambient humidity, and the airflow rate;
a programmable device in communication with the at least one input, the programmable device comprising:
a memory for storing the received at least one parameter and the measurements;

at least one processor coupled to the memory and configured to:
implement a power consumption efficiency model that includes at least one loss parameter and is based on the at least one parameter of the at least one cooling device, wherein the loss parameter is at least one of a no-load loss parameter, a proportional loss parameter, and a square-law loss parameter associated with the power consumption efficiency of the cooling equipment, and implementing the power consumption efficiency model includes:
determining at least one correction factor for at least one loss parameter, the at least one correction factor including an ambient temperature correction factor based on the measured ambient temperature and a nominal ambient temperature, an ambient humidity correction factor based on a difference between the measured ambient humidity and a nominal ambient humidity, and an airflow rate correction factor based on the measured airflow rate and a nominal airflow rate, the measured airflow rate associated with a fan of the at least one cooling device;
applying the at least one correction factor to the at least one loss parameter by multiplying the at least one loss parameter by the at least one correction factor;
determining a power consumption rate for the at least one cooling device based on the at least one corrected loss parameter;
adjusting at least one component of the at least one cooling device based on the power consumption rate, wherein the component comprises at least one of: a computer room air conditioner (CRAC), a computer room air handler (CRAH), a pump, a chiller, or a cooling tower, and wherein the adjustment comprises adjusting at least one of a fan speed, a cooling fluid temperature, and a cooling fluid flow rate; and
at least one output in communication with the programmable device and configured to display the power consumption rate for the at least one cooling device.

14. The system of claim 13, wherein the no-load loss parameter includes a no-load loss coefficient, the proportional loss parameter includes a proportional loss coefficient, and the square-law loss parameter includes a square-law loss coefficient, and the no-load loss coefficient, the proportional loss coefficient, and the square-law loss coefficient are each empirically determined constants based on nominal conditions.

15. The system of claim 14, wherein the power consumption efficiency model includes a no-load loss parameter and the airflow rate correction factor includes a ratio between the measured airflow rate and the nominal airflow rate, and the at least one processor is further configured to apply the airflow rate correction factor to the no-load loss parameter.

16. The system of claim 14, wherein the power consumption efficiency model includes a proportional loss parameter and the at least one processor is further configured to apply at least one of the ambient temperature correction factor and the ambient humidity correction factor to the proportional loss parameter.

17. The system of claim 16, wherein
the ambient temperature correction factor further includes an empirically determined constant based on a mathematical relationship between the at least one cooling device's power consumption, the measured ambient temperature, and a cooling fluid temperature, and
the ambient humidity correction factor further includes an empirically determined constant based on a mathematical relationship between the at least one cooling device's power consumption and the measured ambient humidity.

18. The system of claim 17, wherein the nominal ambient temperature is based on the nominal conditions used to determine the proportional loss coefficient and the nominal ambient humidity is based on the nominal conditions used to determine the proportional loss coefficient.

19. A method for managing power consumption in a data center, the data center including one or more cooling devices, comprising:
receiving at least one parameter of the one or more cooling devices;
receiving, by a controller comprising a processor, measurements of an ambient temperature, an ambient humidity, and an airflow rate from one or more sensors;
implementing a power consumption efficiency model that includes at least one loss parameter and is based on the at least one parameter and the at least one measurement, wherein implementing the power consumption efficiency model includes:
determining at least one correction factor for at least one loss parameter, the at least one loss parameter including a no-load loss parameter that includes a no-load loss coefficient, a proportional loss parameter that includes a proportional loss coefficient, and a square-law loss parameter that includes a square-law loss coefficient, the no-load loss coefficient, the proportional loss coefficient, and the square-law loss coefficient each empirically determined constants based on nominal conditions, and the at least one correction factor including an airflow rate correction factor based in part on a nominal airflow rate, an ambient temperature correction factor based in part on a nominal ambient temperature, and an ambient humidity correction factor based in part on a difference between the measured ambient humidity and a nominal ambient humidity, the nominal ambient temperature and the nominal ambient humidity based on the nominal conditions used to determine the proportional loss coefficient;
applying the at least one correction factor to the at least one loss parameter by multiplying the at least one loss parameter by the at least one correction factor;
determining a power consumption rate for the one or more cooling devices based on the at least one corrected loss parameter; and
adjusting at least one component of a cooling device of the one or more cooling devices, by the controller, based on the power consumption rate, wherein the component comprises at least one of: a computer room air conditioner (CRAC), a computer room air handler (CRAH), a pump, a chiller, or a cooling tower, and wherein the adjustment comprises adjusting at least one of a fan speed, a cooling fluid temperature, and a cooling fluid flow rate.

20. The method of claim 19, wherein the airflow rate correction factor is further based on the measured airflow rate and the ambient temperature correction factor is further based on the measured ambient temperature.

* * * * *